United States Patent [19]

Gerard

[11] B 3,925,324

[45] Dec. 9, 1975

[54] PROCESS FOR THE PREPARATION OF THERMOSETTING POLYMERS FROM N,N-BIS-MALEIMIDE

[75] Inventor: Bernard Gerard, Lyon, France

[73] Assignee: Rhone-Poulenc S.A., Paris, France

[22] Filed: Dec. 20, 1972

[21] Appl. No.: 317,080

[44] Published under the Trial Voluntary Protest Program on January 28, 1975 as document no. B 317,080.

[30] Foreign Application Priority Data

Dec. 27, 1971 France .............................. 71.46753

[52] U.S. Cl. ............................................ 260/78 UA
[51] Int. Cl.$^2$ ......................................... C08L 73/12
[58] Field of Search ................................. 260/78 UA

[56] References Cited
UNITED STATES PATENTS

| | | | |
|---|---|---|---|
| 3,562,223 | 2/1971 | Bargain et al. | 260/78 UA |
| 3,669,930 | 6/1972 | Asahara et al. | 260/78 UA |

Primary Examiner—Harold D. Anderson
Attorney, Agent, or Firm—Stevens, Davis, Miller & Mosher

[57] ABSTRACT

The present invention relates to a continuous process for the preparation of thermosetting polymers possessing imide groups, by heating an N,N'-bis-maleimide and bis-(4-amino-phenyl)-methane at a temperature between 95° and 250°C., in which the bis-maleimide, as a particulate solid, and the diamine, in the molten state, are introduced separately into a kneader equipped with an extrusion screw.

6 Claims, 1 Drawing Figure

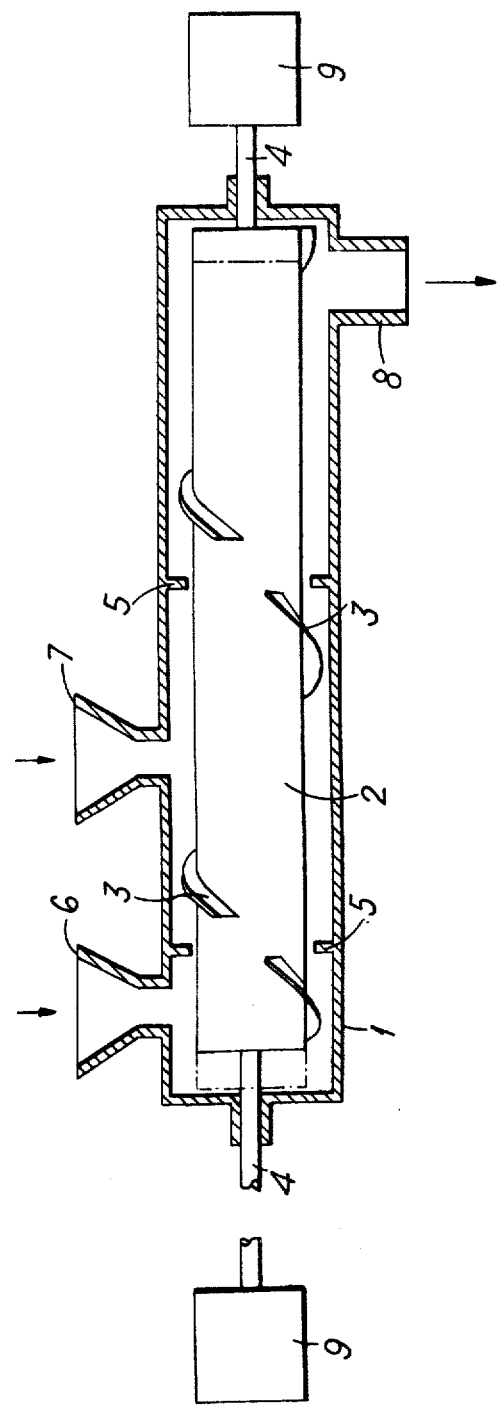

PROCESS FOR THE PREPARATION OF THERMOSETTING POLYMERS FROM N,N-BIS-MALEIMIDE

The present invention relates to a continuous process for the preparation of thermosetting polymers possessing imide groups.

Thermosetting resins produced by reacting an N,N'-bis-imide of an unsaturated dicarboxylic acid with a diprimary diamine which does not possess more than 30 carbon atoms have been described in French Pat. No. 1,555,564. The preparation of these resins can be carried out in bulk, by heating the reagents after they have been intimately mixed, and, depending on the physical state of the reagents, this intimate mixing can be carried out by employing the usual techniques for mixing finely divided solids or by dissolving or dispersing one of the reagents in the other which is kept in the liquid state. This Specification also discloses that, for many uses, it is advantageous to carry out the reaction in two stages. In the first stage, a prepolymer is prepared by heating the intimate mixture of reagents at a temperature of the order of 100° to 250°C. After it has been given the desired shape, the prepolymer can then subsequently be cured by heating up to temperatures of the order of 350°C, optionally under pressure.

According to the present invention there is provided a continuous process for the preparation of a thermosetting prepolymer by heating an N,N'-bis-maleimide and bis-(4-amino-phenyl)-methane at a temperature between 95° and 250°C., in which the bis-imide, as a particulate solid, and the diamine, in the molten state, are introduced separately into a kneader equipped with an extrusion screw.

This process makes it possible to obtain prepolymers which have a very wide range of softening points. Furthermore, although the bis-imide and the diamine are introduced separately, without prior homogeneous mixing, the process is also valuable in that, for a given proportion of reagents, it leads to prepolymers, the properties of which are substantially identical to those of the prepolymers obtained according to the discontinuous prior art procedures.

The bis-maleimides which can be used in the process of the present invention include, for example, those which are mentioned in French Pat. No. 1,555,564, especially N,N'-4,4'-diphenylmethane-bis-maleimide.

By the expression "kneader equipped with an extrusion screw" as used herein is meant an apparatus which does not have a dead zone during the forward movement of the material. Apparatuses of this type, which can contain one or more screws, are described, for example in "Extrusion of Plastics" E.G. FISHER, (Interscience 1964), pages 104 to 108. These kneaders can contain two helical feed screws which engage intimately in one another and turn in the same direction; an apparatus of this type, in fact designed more particularly for the preparation of alkali metal terephthalates, is described in French Pat. No. 1,462,935. Another type of kneader which can be used comprises a helical feed screw with an interrupted thread which simultaneously executes a rotational movement and an oscillating movement in the direction of the axis, provided in a jacket containing teeth adapted to co-operate with the interrupted flights of the screw. Apparatuses of this type are described in, for example, French Pats. Nos. 1,184,392, 1,184,393, 1,307,106 and 1,369,283.

The bis-maleimide and the diamine should be introduced into the kneader in a predetermined ratio. The quantities of reagents are generally such that the ratio $$\frac{\text{number of mole of bis-maleimide}}{\text{number of mols of diamine}} \quad (1)$$

is from 1 to 5.

For convenience in carrying out the process, it is preferred to use the bis-maleimide in the form of particles, the dimensions of which range from 0.1 to 5 mm. Its introduction into the kneader can be controlled by devices which are known for this purpose, such as metering screws or balances.

The bis-(4-amino-phenyl)-methane is fed into the kneader in the liquid state. It can be introduced by means of a metering pump and it is generally preheated to a temperature of the order of 100° to 130°C. The diamine can be fed in at one or more points which are preferably located downstream from where the bis-imide is fed in.

The kneading zone is generally maintained at the chosen temperature by controlled heating of the jacket of the kneader. Furthermore, it is also possible to heat the endless screw or screws in a controlled manner. The jacket is generally uniformly heated over its entire length, but it is also possible to have several adjacent heating zones which provide a temperature which, for example, increases in the direction of forward movement of the material, at the kneading zone. Upstream from where the diamine is first introduced, it is preferred that the temperature is within the range 20° to 130°C.

The dwell time of the materials in the kneading zone can vary to a certain extent depending on the bis-maleimide used, the temperature chosen and the ratio by weight of the reagent In general terms, it is of the order of 1 to 30 minutes. By way of example, if the bis-maleimide is N,N'-4,4'-diphenylmethane-bis-maleimide and if the ratio (I) is approximately 2.5, prepolymers can be obtained which have viscosities of the order of 0.5 to 3 poises (measured as a 45% solution in N-methylpyrrolidone) for a prepolymerisation temperature of 140°C. and a dwell time within the range 5–20 minutes. Under otherwise identical conditions, it is possible to decrease the dwell time of the reagents by adding a strong acid catalyst. The strong acids which can be used and the ways in which they are employed are described in, for example, British Specification No. 1,280,846. By strong acids are meant monoacids and polyacids in the Bronsted sense, of which at least one of the groups has an ionisation constant pka of less than 4.5. These acids may be mineral acids such as hydrochloric, sulphuric, nitric or phosphoric acid, optionally substituted by an organic radical, as in sulphonic and phosphonic acids, as well as aliphatic carboxylic acids. The preferred acid is maleic acid. It is also possible to carry out the reaction in the presence of trimellitic anhydride, according to the methods described in French Pat. No. 1,597,902.

The process of this invention is also very suitable for preparing prepolymers containing fillers, particularly pulverulent fillers. These fillers can be incorporated continuously, for example with the bis-maleimide or at any other point in the kneading zone.

The following Examples further illustrate the present invention.

EXAMPLE 1

The apparatus used is a kneader made by the BUSS laboratory, known as a "KO-Kneader" type PR 46. This kneader comprises a helical feed screw formed by a suitably driven shaft carrying interrupted helicoidal threads, the interruptions forming separate flights. The screw is housed in a body comprising three adjacent coaxial cylindrical double-walled jackets; the internal wall of the kneader carries projections in the form of teeth. The screw is subjected to a rotational movement and simultaneously to an oscillating movement in the direction of its axis, and this creates an exchange of material in two directions.

Water at 20°C., is circulated in the first jacket and a fluid heated to 145°C., is circulated in the other two jackets. The speed of rotation of the screw is 33 revolutions/minute.

N,N'-4,4'-Diphenylmethane-bis-maleimide is introduced, by means of a metering balance, at the rate of 1,800 g./hour, into the first part of the kneader (corresponding to the first jacket), it is introduced in the form of grains, the average size of which is of the order of 0.25 mm.

Bis-(4-amino-phenyl)-methane, kept at 110°C., is introduced at the rate of 403 g./hour into the second part of the kneader. A prepolymer, the softening point of which is of the order of 65°C., is collected at the outlet. The average dwell time of the material in the kneader is of the order of 6 minutes. After having heated it to 150°C., a sample of prepolymer was used as a coating composition by pouring it, when hot, onto metallic conductors.

EXAMPLE 2

The procedure described in Example 1 is followed, but trimellitic anhydride is introduced intimately mixed with the bis-imide, the trimellitic anhydride being present in an amount of 2.5% by weight relative to the bis-imide; the mixture is introduced at the rate of 1,800 g./hour.

A prepolymer which has a softening point of 110°C., and a viscosity of 1.6 poises (measured as a 45% solution in N-methylpyrrolidone) is collected at the outlet.

A 45% by weight solution of prepolymer in N-methylpyrrolidone is used to coat satin-type glass fabric, the weight of which is 308 g./m$^2$ and which has been treated with gamma-aminopropyltriethoxysilane. The impregnated fabric contains 35 g. of prepolymer per 65 g. (of fabric); it is dried in a ventilated atmosphere at 140°C., for 15 minutes. 12 squares (15 × 15 cm.) are then cut out, stacked and placed between the platens of a press at 100°C. A pressure of 60 bars is applied between the platens, the temperature of which is raised to 180°C., over the course of 30 minutes. The whole is kept under these conditions for one further hour and then, as it is cooling under pressure, the laminate is released at 100°C.

After a supplementary heat treatment at 250°C., for 24 hours, the laminate has a flexural breaking strength of 54 kg./mm$^2$ at 25°C., and 38 kg./mm$^2$ at 250°C. After heating at 250°c., for 1,000 hours, this strength is still, respectively, 38 and 27 kg./mm$^2$.

EXAMPLE 3

An industrial BUSS kneader, known as a "KOK-neader" type PR 140, is used. Except for a difference in scale, this apparatus is essentially the same as that described in Example 1.

The three jackets are supplied with fluids, the temperatures of which are respectively 20°C., 130°C., and 160°C. The speed of rotation of the screw is 40 revolutions/minute.

The N,N'-4,4'-diphenylmethane-bis-maleimide is introduced at the rate of 24.9 kg./hour as an intimate mixture with trimellitic anhydride (625 g./hour). The bis-(4-amino-phenyl)-methane is preheated to 125°C., and injected at the rate of 5.6 kg./hour.

The dwell time in the kneader is of the order of 7 to 8 minutes. A prepolymer which softens at 76°C., is collected at the outlet.

A typical embodiment of a kneader suitable for use in the process of this invention is illustrated schematically in the accompanying FIGURE which shows the kneader in cross-section. The kneader consists of a jacket, 1, which is provided with a helical feed screw, 2, having an interrupted thread, 3. The screw, 2, is provided with a drive shaft, 4, which can execute simultaneously a rotational and an axial oscillating movement with the aid of drive means shown generally at 9. The jacket, 1, is equipped with teeth, 5, adapted to co-operate with the interrupted thread 3, and with inlets 6 and 7 and an outlet 8. In a preferred operation, the bis-maleimide is introduced via inlet 6 and the diamine via inlet 7. The action of the feed screw 2 causes the ingredients to mix and pass down towards the outlet 8. During this time the jacket, 1, is heated (by means not shown) either uniformly or non-uniformly, as discussed above.

I claim:

1. In a continuous process for the preparation of a thermosetting prepolymer by heating a mixture of an N,N'-bis-maleimide and bis-(4-amino-phenyl)-methane at a temperature between 95° and 250°C., the improvement wherein the bis-maleimide, as a particulate solid, and the diamine, in the molten state, are mixed by introducing separately into a kneader equipped with an extrusion screw, the molar ratio of bis-maleimide to diamine being from 1 to 5, advancing, polymerising and collecting the extruded prepolymer.

2. A process according to claim 1, the improvement wherein the bis-maleimide and diamine are introduced separately into a kneader which comprises a helical feed screw having an interrupted thread, which screw simultaneously executes an axial rotational and oscillating movement provided in a housing equipped with teeth adapted to co-operate with the interrupted vanes of the screw.

3. A process according to claim 1, the improvement wherein the diamine is introduced downstream from where the bis-maleimide is introduced.

4. A process according to claim 1, the improvement wherein the diamine is preheated to a temperature from 100° to 130°C.

5. A process according to claim 1, the improvement wherein the bis-maleimide has a particle size from 0.1 to 5 mm.

6. A process according to claim 1, the improvement wherein the bis-maleimide is N,N'-4,4'-diphenylmethane-bis-maleimide.

\* \* \* \* \*